United States Patent Office 2,812,305
Patented Nov. 5, 1957

2,812,305

PHENOL REMOVAL FROM PHENOL-BEARING WATERS

Dan P. Manka, Pittsburgh, Pa., assignor to Jones & Laughlin Steel Corporation, Pittsburgh, Pa., a corporation of Pennsylvania No Drawing. Application August 25, 1954,
Serial No. 452,219

5 Claims. (Cl. 210—21)

This invention relates to the purification of phenol-bearing waters and is particularly concerned with the purification of phenol-bearing waters from by-product coke plants and the like.

Waters discharged from plants engaged in the by-product coking of coal contain phenol compounds which are objectionable even when present in minute amounts in water which is to be purified for drinking purposes. Such purification treatment ususally includes chlorination, and the above-mentioned phenol compounds when chlorinated impart an offensive taste and odor to the water. It is therefore desirable to remove substantially all phenol compounds from coke plant waters before these waters are discharged into natural water courses. The reduction of phenol compounds to a tolerable limit, which is on the order of a few parts per million, is, however, very difficult to bring about on a commercial scale.

It is an object of my invention, therefore, to provide a process which reduces the phenol content of phenol-bearing or phenol-contaminated waters to a tolerable minimum. It is another object to provide such a process which can be carried out commercially at a reasonable cost. Other objects will appear in the course of the following description of my invention.

It is known that phenol compound can be extracted from phenol-bearing waters by the use of reagents which are solvents for the phenols but are themselves substantially insoluble in water. Aromatic hydrocarbons constitute one class of such solvents. Toluene in particular is quite generally used for this purpose because of its low solubility in water. At by-product coke plants the so-called light oil cut which contains benzene, toluene, and xylene is commonly used. A typical light oil is composed as follows:

| | Percent |
|---|---|
| Benzene | 65–75 |
| Toluene | 15–25 |
| Xylene | 3–10 |

A single stage of extraction with toluene, however, removes only about 53% of the phenols in the waters. Five stages of conventional extraction with toluene or light oil are generally required to lower the phenol content of phenol-bearing waters to a tolerable level. For example, waters containing 4100 p. p. m. of phenols, when extracted in five steps with light oil as a solvent, displayed a phenol content of 12 p. p. m. Such a process, of course, is relatively costly to install and carry on. I have found that the solubility of phenols in toluene and other aromatic hydrocarbon phenol solvents can be greatly increased if a small amount of 2-methyl-5-ethylpyridine is added to the solvent. A three-stage extraction of phenol-bearing waters with a solvent containing such additive can reduce the phenol content of the waters to below two parts per million.

2-methyl-5-ethylpyridine, which is synthesized by the catalytic reaction of ammonia with acetaldehyde, is a light amber liquid soluble in aromatic hydrocarbons and in alcohol but essentially insoluble in water. Its boiling point at 760 mm. of mercury is 174° C., its density at 23/24° C. is .9184 gram per milliliter, and its molecular weight is 121.18. I find that the addition to an aromatic hydrocarbon solvent of a small amount of this reagent, preferably between about 1% and 3½% by volume, greatly increases the ability of the solvent to extract phenols from phenol-containing water.

A present preferred embodiment of my process will now be described with reference to the treatment with a toluene solvent of phenol-bearing waters. This process employs three stages of extraction. I prefer, first, to remove oil and solids in the phenol-bearing waters by settling, and if the waters contain strong bases, I also prefer to bring the pH value of the waters within the range of about 6.5 to about 9.5. This pH adjustment can be made by the addition of dilute sulfuric acid. If strong bases are present in the waters, the phenols are found as stable phenolates which do not dissociate or hydrolyze so as to permit the phenols to dissolve in such solvents until these bases are neutralized. On the other hand, if the waters are too acid, some of the 2-methyl-5-ethylpyridine may be converted into water soluble salts.

Waters may be treated at temperatures below those causing excessive loss of the solvent by evaporation. Temperatures between about 25° C. and 65° C. are satisfactory for the operation of my process. The phenol-bearing waters are introduced into the first stage of my process and there mixed with solvent flowing from the second stage. It will be understood that each stage of my process may be carried out in apparatus conventionally employed for solvent extraction. Those skilled in the art are aware that each extraction stage requires that contact between the waters and the solvent be sufficiently intimate and maintained for a sufficient period of time to permit distribution equilibrium to be established, so that raffinate and extract are equilibrium solutions. When these conditions are attained, the two liquids are allowed to separate by gravity, the solvent settling above the water. The settled water from the bottom of the first stage is introduced into the second stage where it is mixed with solvent flowing from the third stage. The settled water from the second stage is introduced into the third stage and mixed with solvent from regenerators to be described. The water that settles in the third stage is quite low in phenol content, but includes a certain amount of solvent entrained therein. I find it desirable to remove entrained solvent from this water if it is to be discharged into sewers by bubbling through the water a non-oxidizing gas, such as nitrogen or coke oven gas.

Neutral waste waters containing phenols in amounts ranging from 128 to 278 parts per million were treated by my process, as described above, with equal volumes of toluene containing 1% by volume of 2-methyl-5-ethylpyridine and the treated waste waters were found to have phenol contents of 1.33 to 1.35 parts per million. When similar waste waters were treated with equal volumes of toluene containing higher percentages by volume of the additive, the effluents exhibited lower concentrations of phenols. I have likewise treated, by my process as described above, weak ammonia liquors coming from a by-product coke plant. These liquors contained phenols in amounts ranging from 2,480 to 4,500 parts per million but after treatment with a light oil solvent having a volume about 20% greater than that of the ammonia liquor, and varying 2-methyl-5-ethylpyridine concentrations, displaced the results tabulated below:

Table I

| 2-methyl-5-ethylpyridine content of solvent, percent by volume | Phenol content of untreated ammonia liquor, p. p. m. | Phenol content of treated ammonia liquor, p. p. m. |
|---|---|---|
| .000 | 4,568 | 76 |
| .125 | 4,568 | 54 |
| .5 | 4,568 | 21 |
| 1.0 | 4,500 | 7.6 |
| 1.5 | 2,480 | 4.1 |
| 3.6 | 4,000 | 2.1 |
| 5.0 | 4,000 | 1.05 |

It is economically desirable to regenerate and reuse the phenol-bearing solvent removed from the first stage of my process. This may be accomplished by introducing such solvent into the bottom of a column filled with fine glass wool or some similar packing material. As the solvent flows up through the wool, the entrained water coalesces and separates from it. The clear solvent from the top of the column is introduced into a layer of 6% aqueous solution of sodium hydroxide in the bottom of a first regenerator vessel, where a large portion of the phenols are recovered from the solvent as sodium phenolate. The solvent partially freed from phenol settles above the caustic soda solution and is pumped into a second regenerator vessel similar to the first and containing the same sodium hydroxide solution. The solvent settling out from this vessel contains less than 50 parts per million of phenol. This regenerated solvent is then caused to flow through a layer of glass wool or similar material in a settling tank for the removal of entrained alkali. The solvent from this tank is pumped into the third extraction stage of my process, as has been mentioned.

The figures of Table I show that the effectiveness of the 2-methyl-5-ethylpyridine additive with respect to phenol extraction increases as the amount of the additive is increased to at least 5% by volume of the solvent. Concentrations above 5% are also effective but a phenol content of slightly over 1 part per million, which may be obtained in a small number of stages by the use of 5% of the additive, is as low as is presently required for any purpose of which I am aware. The additive may be employed in amounts smaller than 1% by volume of the solvent with a corresponding reduction in the effectiveness of the extraction process. It will be understood that by multiplying the number of extraction stages a very high degree of phenol removal may be obtained even with very small amounts of additive, and it will also be understood that an increase in the volume of solvent relative to the volume of phenol-bearing waters treated will increase the effectiveness of extraction.

My process is applicable to phenol-bearing waters from various sources, such as by-product coke plants, as have been mentioned, phenolic resin plants, chemical plants making phenols, installations for cleaning tank cars that have carried phenolic materials, etc. Weak ammonia liquors coming from by-product coke plants are also comprehended within the term "phenol-bearing waters."

I claim:

1. The process of removing phenols from phenol-bearing waters comprising treating said waters with a mixture of an aromatic hydrocarbon solvent for phenols and 2-methyl-5-ethylpyridine, whereby phenols are dissolved in said solvent, and separating said mixture from the waters.

2. The process of claim 1 in which the volume of the waters and the volume of the aromatic hydrocarbon solvent are about equal.

3. The process of claim 1 in which 2-methyl-5-ethylpyridine is present in amounts between effective amounts and about 5% of the volume of the aromatic hydrocarbon solvent.

4. The process of removing phenols from waters containing stable phenolates comprising adjusting the pH of said waters to a value in the range from about 6.5 to about 9.5, treating said waters with a mixture of an aromatic hydrocarbon solvent for phenols and 2-methyl-5-ethylpyridine, whereby phenols are dissolved in said solvent, and separating said mixture from the waters.

5. The process of removing phenols from waters containing stable phenolates comprising adjusting the pH of said waters to a value in the range from about 6.5 to about 9.5 bringing said waters into intimate contact with a substantially equal volume of an aromatic hydrocarbon solvent for phenols containing between about 1% and about 3½% by volume of 2-methyl-5-ethylpyridine, whereby said phenols are dissolved in said solvent, and separating said phenol-bearing solvent from the waters.

References Cited in the file of this patent

UNITED STATES PATENTS

| 1,795,382 | Ulrich | Mar. 10, 1931 |

UNITED STATES PATENT OFFICE

CERTIFICATE OF CORRECTION

Patent No. 2,812,305                                            November 5, 1957

Dan P. Manka

It is hereby certified that error appears in the printed specification of the above numbered patent requiring correction and that the said Letters Patent should read as corrected below.

Column 2, line 70, for "displaced" read -- displayed --.

Signed and sealed this 7th day of January 1958.

(SEAL)
Attest:
KARL H. AXLINE
Attesting Officer

ROBERT C. WATSON
Commissioner of Patents